Feb. 12, 1929.  
G. E. SEIL  
GAS PURIFICATION PROCESS  
Filed Dec. 26, 1925
1,701,825
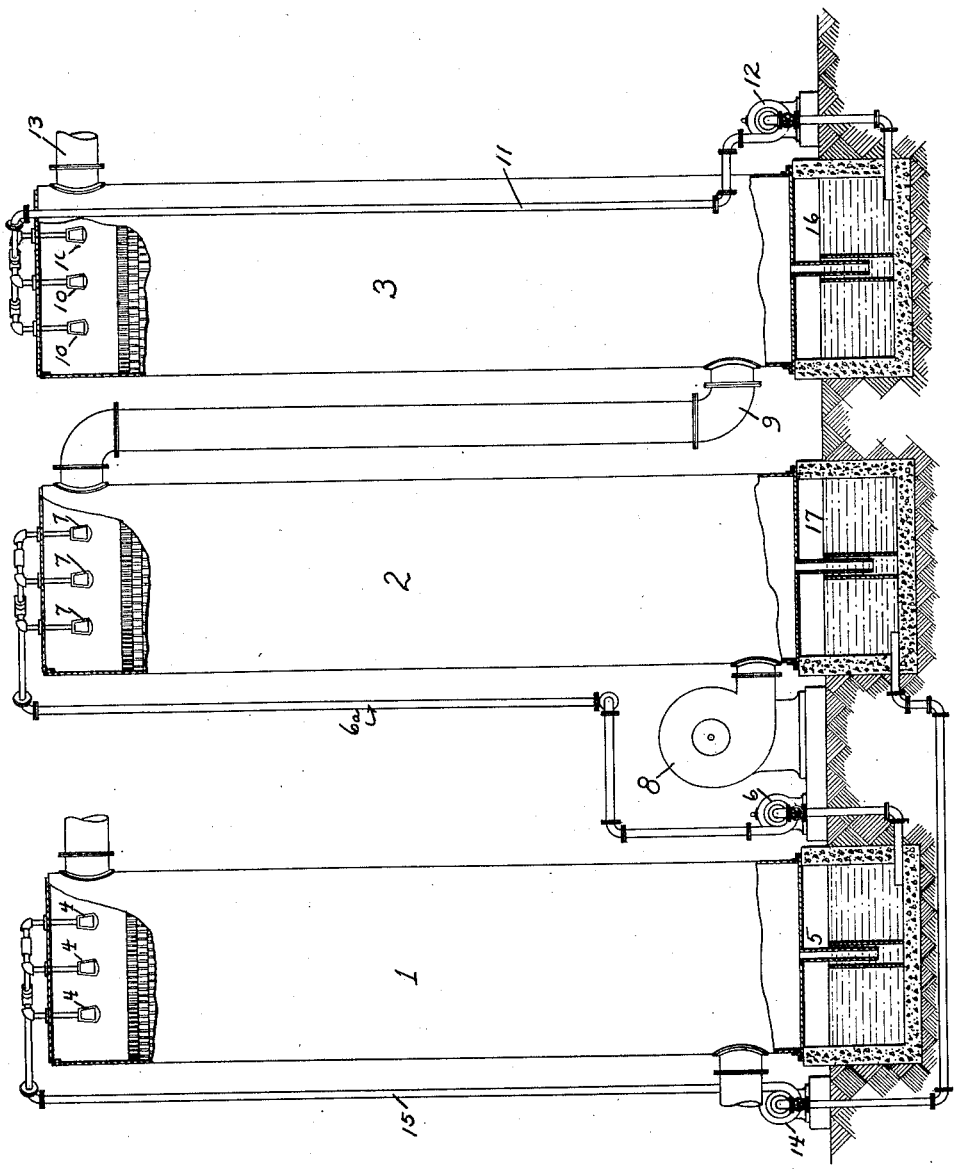
INVENTOR  
Gilbert E. Seil  
BY  
Murray Clark T Carpenter  
his ATTORNEY Patented Feb. 12, 1929.

1,701,825

UNITED STATES PATENT OFFICE.

GILBERT E. SEIL, OF NEWARK, NEW JERSEY, ASSIGNOR TO THE KOPPERS COMPANY, OF PITTSBURGH, PENNSYLVANIA, A CORPORATION OF PENNSYLVANIA.

GAS-PURIFICATION PROCESS.

Application filed December 26, 1925. Serial No. 77,806.

This invention relates in general to the treatment of gases, such as coke oven gas, water gas, etc., and has for an object to effect an efficient purification of the gas, while it flows continuously, by an absorption and removal from the gas of obnoxious constituents such as sulphur compounds principally in the form of hydrogen sulphide, and more particularly, this invention relates to the purification of gases containing hydrogen sulphide, by subjecting the said gases to contact with a liquid medium containing certain bacteria which have the ability to oxidize the said hydrogen sulphide.

In all previous processes and apparatus, such purification has been attempted or accomplished by means of reactions wholly physical and chemical in nature. The effect of certain of these processes is to transfer the hydrogen sulphide to a current of air, that might or might not be released into the atmosphere. For example, the United States patents of Ramsburg, No. 1,389,980, and Jacobson, No. 1,390,037, both of September 6, 1921, for process and apparatus for purifying gases, employ a liquid purifying medium which comprises a solution of sodium carbonate which absorbs hydrogen sulphide from the gas, as may, for example, be illustrated by the following equation:

and that after contact with the impurity laden gas is actified and rejuvenated by aerating the same in a suitable apparatus with a current of air whereby the $H_2S$ is transferred to the current of air. The rejuvenation of the fouled solution by the air may be illustrated by means of the following equation:

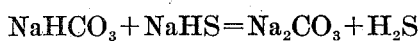

The air acts as a carrier for the $H_2S$, and the disposal of this air, containing varying amounts of hydrogen sulphide, has become an important problem in or near residential districts.

The present invention is not in itself an improvement on any such processes, or any other processes involving physico-chemical reactions alone, but is an entirely new and novel method for the removal of hydrogen sulphide from gases containing the same. It may be employed in conjunction with either of the liquid purification processes mentioned in the above noted patents, the function of the present invention being to remove hydrogen sulphide from the actifier air of the said processes; or the invention may be applied to the gas directly. The invention depends upon the ability of certain bacteria to oxidize hydrogen sulphide to sulphur or sulphuric acid or both, and water. Numerous bacteria exist which have been isolated and found to be capable of such oxidation, and any of these may be successfully employed in the purification of the gas containing hydrogen sulphide or other sulphides, although it is evident that the various types of bacteria differ from each other somewhat in oxidizing ability, in sensitivity to changes of temperature, acidity and so on, and so I do not limit myself to the use of a particular organism. However, the thiobacillus thioparus and thiobacillus denitrificans may be cited as examples of bacilli which are capable of oxidizing hydrogen sulphide. Thiobacillus thioparus was demonstrated by Nathanson in sea water and by Beijerinck in canal water. It was isolated on a medium containing sodium thiosulphate as a source of sulphur, in addition to minerals and ammonium chloride (0.01 per cent) and sodium carbonate as a source of carbon. This organism is 3 by $0.5\mu$, not forming any spores, is very motile and very sensitive dying out on the plate in a week. The thiosulphates can be replaced by CaS, $H_2S$ and elementary sulphur.

Thiobacillus denitrificans was isolated by Beijerinck by adding to 100 parts of canal water, 10 parts of powdered sulphur, 0.05 $KNO_3$, 0.02 $Na_2CO_3$, 2 $CaCO_3$, 0.02 $K_2HPO_4$ and 0.01 part $MgCl_2$, and incubating the medium at 30° C. The sulphur was oxidized and growth was accompanied by a reduction of the nitrate to atmospheric nitrogen. The organism was isolated on agar plates and was found to be a motile, short rod, hardly distinguishable morphologically from the thiobacillus thioparus. Both organisms use carbonates and bicarbonates as sources of carbon and rapidly lose, on the plate, their ability to grow.

Most of the sulphur bacilli are present in the seepage water from the spent oxide heaps of gas plants, and other waste accumulations high in sulphur.

In general the reactions which take place under stimulus of the presence of such bacilli are as follows:

(1) $2H_2S + O_2 = 2H_2O + S_2 + 122$ Cal.
(2) $S_2 + 3O_2 + 2H_2O = 2H_2SO_4 + 282$ Cal.

The $H_2S$ may also be oxidized directly to $H_2SO_4$. Any other sulphides and any thiosulphates present are also oxidized. The oxidation of the hydrogen sulphide may be allowed to progress only as far as the formation of sulphur, or the bacilli may be allowed to complete both of the reactions given above, with resultant formation of sulphuric acid. In the former case, means for removing sulphur immediately subsequent to its formation may be provided. In the latter case, it will be seen that the acidity of the medium will be gradually increased until such a concentration is reached that the life of the bacilli will be imperiled. To prevent this, means for neutralizing the acid may be provided, for instance, a suitable quantity of tricalcium phosphate may be added to the medium whereby such neutralization may be effected. Or a portion of the medium may be withdrawn from time to time, and the volume made up by the addition of an equal volume of neutral medium or water.

The medium that is employed as a vehicle for the bacteria employed for oxidation must contain sufficient food to keep these bacteria alive and active, and may also contain other materials to increase their activity, or to counteract the result of such activity. A medium which has been found suitable comprises a water solution containing 5.5 grs. ammonium sulphate, 2.8 grs. dipotassium acid phosphate, 1.4 grs. magnesium sulphate, 1.4 grs. potassium chloride and 0.03 grs. of ferrous sulphate in every gallon of the said solution, but the invention is not limited to the employment of any specific medium.

In addition to the general objects recited above the invention has for further objects such other improvements and advantages as may be found to obtain in apparatus and process hereinafter described or claimed.

In the accompanying drawing forming a part of this specification, and showing for purposes of exemplification a preferred form and manner in which the invention may be embodied and practiced, but without limiting the claimed invention specifically to such illustrative instance or instances:

The figure represents a side elevational view partly in section of an apparatus for the purification of gas wherein the present invention is applied to remove hydrogen sulphide from the actifier air of the Ramsburg and Jacobson patented liquid purification processes hereinabove noted.

When purification of gas by the so-called liquid purification method is employed, the apparatus shown in the figure is especially suitable wherein the hydrogen sulphide is transferred from a stream of coal gas to a stream of air, from which it may be removed by the application of the present invention. One actifier tower and two absorbing towers are necessary, the first of the absorbing towers operating in the same manner as that employed in the ordinary liquid purification, and the second absorbing tower operating for circulation of the medium containing bacteria that absorbs $H_2S$ from the actifier air.

The gas to be purified traverses the absorber 1, that is filled with suitable contact material such as wood hurdles or chips, coke, metal turnings and the like, upwardly, and during its course through the absorber comes into intimate contact with an alkaline $Na_2CO_3$ solution that is introduced by the sprays 4. The said solution removes the hydrogen sulphide from the gas and is removed at 5, and forced by a pump 6 through line 6a and the sprays 7 that distribute it to the actifier 2, that is similar to the absorber 1. The fan 8 forces a current of air upward through the actifier 2, that removes the hydrogen sulphide from the alkaline solution, which is thus rejuvenated. The rejuvenated solution is accumulated in the sump 17 and is returned to the absorber 1 by means of pump 14 and line 15 for the purification of fresh quantities of gas. The hydrogen sulphide-laden air passes out of actifier 2 and enters the purifier or absorber 3 through the inlet 9. The purifier 3 may be similar to the absorber 1 and actifier 2, or may consist of large shallow beds of suitable contact material. The liquid medium containing bacteria is introduced through the sprays 10 at the top of the purifier 3, is allowed to accumulate in the sump 16 and may recirculate by means of line 11 and pump 12. The air that has been subjected to intimate contact with the said medium, and has thus been purified, escapes into the atmosphere at 13 and may be passed through iron oxide catch boxes as a precautionary measure if desired. Such air provides the necessary oxygen for the bacteria, but when the gas being washed with such medium consists of fuel gas or gas other than air, the medium is subjected to aeration after contact with the gas and such aeration provides the necessary oxygen.

Means for the removal of the sulphur or neutralization of the excess acidity may be provided, according to the extent of oxidation allowed. For example, a plurality of purifiers 3 might be employed, so that one might be kept in operation continuously while the sulphur was removed from the spare or spares. When the sulphur is separated in this fashion, the entrainment of a portion of the bacteria will be found to render the sulphur especially valuable for use as a fertilizer, for the oxidation to sulphuric acid may be allowed to take place after the sulphur has been spread on the ground, as is set forth in the United States patents to Lipman.

The invention is not limited to the specific instance and embodiment herein presented, but may be applied for the purification of fuel gases directly, or for the purification of any gases containing hydrogen sulphide and not fatal to the bacterial life.

The invention as hereinabove set forth is embodied in particular form but may be variously embodied within the scope of the claims hereinafter made.

I claim:

1. A process of purifying gases of hydrogen sulphide impurities which comprises: subjecting the gas to the action of bacteria which have the ability to oxidize said impurities.

2. A process of purifying gases of hydrogen sulphide which comprises: subjecting the gas to contact with a medium containing bacteria which are capable of oxidizing hydrogen sulphide.

3. A process of purifying gases containing hydrogen sulphide which comprises: subjecting the gas to contact with a medium containing bacteria which are capable of oxidizing hydrogen sulphide and containing means for supporting the life processes of said bacteria.

4. A process as claimed in claim 3 in which the bacteria are thiobacillus thioparus.

5. A process of purifying gases containing hydrogen sulphide which comprises subjecting the gas to contact with a medium containing thiobacillus thioparus, said medium consisting of a water solution containing 5.5 grs. ammonium sulphate, 2.8 grs. dipotassium acid phosphate, 1.4 grs. magnesium sulphate, 1.4 grs. potassium chloride and 0.03 grs. ferrous sulphate to each gallon of said solution.

6. A process of purifying gases containing hydrogen sulphide which comprises subjecting the gas to contact with a medium containing thiobacillus thioparus, said medium consisting of a water solution containing ammonium sulphate, dipotassium acid phosphate, magnesium sulphate, potassium chloride and ferrous sulphate.

7. A process of purifying gases of hydrogen sulphide which consists in subjecting the gas to contact with a medium containing bacteria capable of oxidizing hydrogen sulphide and aerating the medium for the purpose of providing it with the necessary oxygen.

8. A process as claimed in claim 7 in which the bacteria are aerobic bacteria.

9. A process of purifying gases containing hydrogen sulphide which comprises: subjecting the gas to contact with a medium containing bacteria which are capable of oxidizing hydrogen sulphide and containing means for supporting the life processes of said bacteria; accumulating the medium after contact with the gas and removing the free sulphur that has been produced in the same before using the medium again for further contact with gas, and returning the sulphur-free medium to further treat gas.

10. A process of purifying gases containing hydrogen sulphide which comprises: subjecting the gas to contact with a medium containing bacteria which are capable of oxidizing hydrogen sulphide and containing means for supporting the life processes of said bacteria, accumulating the medium after contact with the gas and removing the free sulphur that has been produced in the same and neutralizing the excess acidity of the medium before using the medium again for further contact with gas, and returning the sulphur-free medium to further treat gas.

11. A process of purifying gases containing hydrogen sulphide which comprises: subjecting the gas to contact with a medium containing bacteria which are capable of oxidizing hydrogen sulphide and containing means for supporting the life processes of said bacteria and containing a neutralizing agent for the purpose of neutralizing the excess acidity resulting from the oxidation of sulphur and sulphides to sulphuric acid.

12. A process as claimed in claim 11 in which the neutralizing agent is tricalcium phosphate.

13. A process of purifying gases which consists in: subjecting the gas to contact with an alkaline absorbent solution to absorb hydrogen sulphide from the gas; revivifying the fouled solution by means of a current of air whereby hydrogen sulphide is transferred to said air and subjecting the air containing hydrogen sulphide to the oxidation action of bacteria capable of oxidizing sulphur and sulphur compounds.

14. A process as claimed in claim 13 in which the alkaline absorbent solution is a sodium carbonate solution.

15. A process as claimed in claim 13 in which the bacteria consist of thiobacillus thioparus.

16. A process as claimed in claim 13 in which the bacteria are contained in a medium consisting of a water solution of ammonium sulphate, dipotassium acid phosphate, magnesium sulphate, potassium chloride and ferrous sulphate.

17. A process as claimed in claim 13 in which the bacteria are contained in a medium that contains means for supporting the life processes of said bacteria.

18. A process as claimed in claim 13 in which the bacteria are contained in a medium that contains means for supporting the life processes of said bacteria and that contains a neutralizing agent for the purpose of neutralizing excess acidity resulting from oxidation of sulphur and sulphides to sulphuric acid.

19. A process as claimed in claim 13 in which the bacteria are contained in a medium that contains means for supporting the life processes of said bacteria and that contains tricalcium phosphate for the purpose of neutralizing excess acidity resulting from oxidation of sulphur and sulphides to sulphuric acid.

20. A process of purifying gases of hydrogen sulphide which consists in: washing the gas with a sodium carbonate solution to absorb hydrogen sulphide from the gas; aerating the spent solution to transfer hydrogen sulphide from the spent solution to the aerating air; returning the aerated solution to the gas washing stage; washing the aerating air containing hydrogen sulphide with a medium supporting thiobacillus thioparus to oxidize the hydrogen sulphide with formation of free sulphur; accumulating the spent medium and removing the free sulphur therefrom and neutralizing the excess acidity of the medium before using it for further treatment of air; and returning and re-using said medium for further treatment of air.

In testimony whereof I have hereunto set my hand.

GILBERT E. SEIL.